United States Patent
Cassell

[15] 3,701,404
[45] Oct. 31, 1972

[54] TORQUE OVERLOAD RELEASE COUPLING

[72] Inventor: Perry E. Cassell, 132 Shipmans Eddy, Warren, Pa. 16365

[22] Filed: March 31, 1971

[21] Appl. No.: 129,752

[52] U.S. Cl. ............................. 192/56 R, 192/67 P
[51] Int. Cl. ........................................... F16d 43/20
[58] Field of Search .......... 192/56 R, 67 R, 67 P, 150

[56] References Cited

UNITED STATES PATENTS

| | | | |
|---|---|---|---|
| 2,497,893 | 2/1950 | Linahan | 192/56 R |
| 998,615 | 7/1911 | Huneke | 192/56 R |
| 2,045,572 | 6/1936 | Dow | 192/56 R |
| 2,128,715 | 8/1938 | Reich | 192/56 R X |
| 2,443,213 | 6/1948 | Weber | 192/56 R X |
| 2,778,468 | 1/1957 | Babaian | 192/56 R |
| 3,203,523 | 8/1965 | Gilder et al. | 192/56 R |

*Primary Examiner*—Allan D. Herrmann
*Attorney*—Ralph Hammar

[57] ABSTRACT

A torque overload release coupling having a clutch member rotatably and slidably journaled on one of the driving and driven members with drive keys extending through the member on which it is journaled. The drive keys and the other member have cooperating cam surfaces engaging in the driving position and exerting an axial force in proportion to drive torque tending to move the drive keys out of engagement. Snap action detents hold the clutch member in the driving and released positions.

7 Claims, 4 Drawing Figures

PATENTED OCT 31 1972

3,701,404

INVENTOR.
Perry E. Cassell
BY Ralph Hammar
Attorney

TORQUE OVERLOAD RELEASE COUPLING

This invention is a torque overload release coupling having driving and driven members journaled to each other and a clutch member rotatably and slidably journaled on one of the members and having drive keys with cam faced surfaces making driving engagement with the other member. In the engaged position the cam surfaces force the clutch member axially toward a disengaged position. Snap action detents hold the clutch member in the engaged and disengaged positions.

Figure 1:
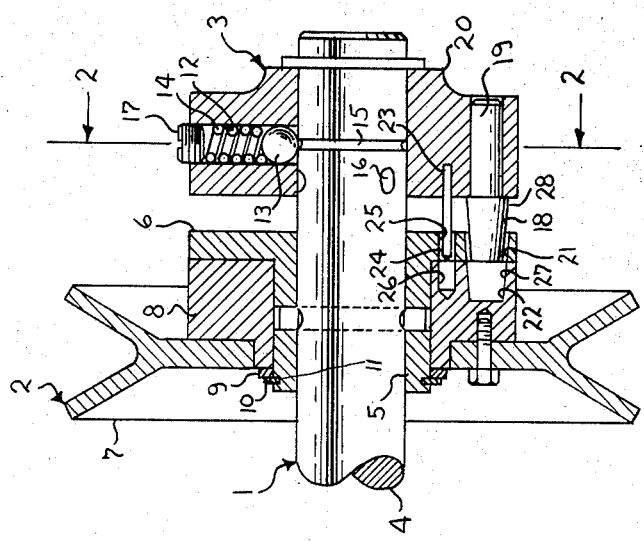
FIG. 1 is a longitudinal section through a torque overload release coupling.
Figure 4:
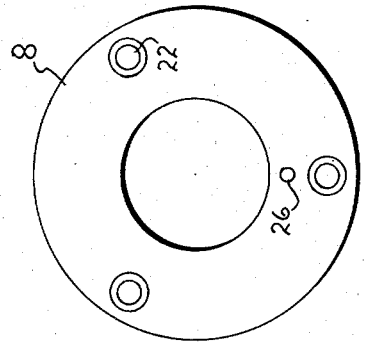
FIGS. 3 and 4 are plan views of parts of the driving and driven members.
Figure 2:
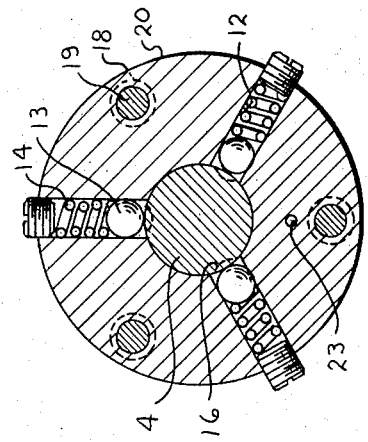
FIG. 2 is a section on line 2—2 of FIG. 1.
Figure 3:
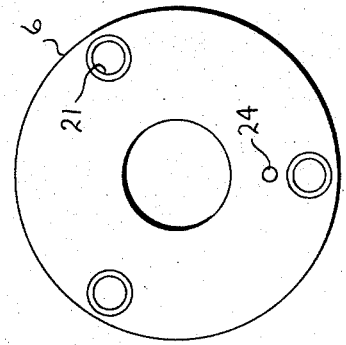

The coupling comprises driving and driven members 1 and 2 and a clutch member 3.

Member 1 comprises a shaft 4, a bushing 5 fixed to the shaft and having an outwardly extending flange 6. Member 2 comprises a pulley 7 fixed to a sleeve 8 rotatably journaled on the bushing 5. Axial movement of the sleeve 8 relative to member 1 is prevented by the flange 6 and a thrust washer 9 held in place by a snap ring 10 in a groove 11 in the bushing 5.

Clutch member 3 is rotatably and slidably journaled on the shaft 4 and has radial ways 12 for balls 13 which are urged by coil springs 14 into engagement with detent recesses 15 and 16 in the shaft 4. Set screws 17 adjust the pressure of the springs 14. Detent recess 15 may take the form of a shallow continuous groove in the shaft 4. Detent recesses 16 are individual semi-spherical depressions, one for each ball 13, which locate the clutch member 3 both axially and angularly in the driving position of the clutch member. The resistance offered by the ball detents is controlled by the depth of the depressions 15, 16. The depression 15 is quite shallow because its function is to hold the clutch member 3 in the disengaged position shown in FIG. 1. The depressions 16 are deeper since they cooperate with the balls 13 to resist movement of the clutch member 3 towards the disengaged position until the driving torque has exceeded a threshold determined by the adjustment of set screws 17. Once this threshold is exceeded and the balls start to move out of the recesses 16, the movement proceeds with a snap action which insures movement of the clutch member to the released position.

The clutch member 3 has drive keys in the form of projections or tapered heads 18 on pins 19 fixed in the rim 20 of the clutch member. In the released position shown, the tapered heads 18 are received in openings 21 in the flange 6 but are spaced from recesses 22 in the bushing 8 so that the driving connection between the members 1 and 2 is broken. Since the projections 18 always remain in the openings 21, the members 1 and 3 are keyed together although they are free to rotate relative to the member 2. In the driving position, the projections 18 have a tight fit in openings 21 so there is little or no angular lost motion between members 1 and 3. In the released position, there is some clearance between the projections 18 and openings 21 which permits angular lost motion between members 1 and 3.

To reestablish a driving connection between the members 1 and 2, the clutch member 3 is rotated until a locating pin 23 fixed to the clutch member comes opposite a recess 26 in the bushing 8. In this position the tapered projections 18 are aligned with the recesses 22 and only the slight resistance offered by the engagement of the balls 13 with the groove 15 need be overcome to move the clutch member 3 toward the flange 6 and cause the tapered projections 18 to enter the recesses 22 and the free end 24 of the locating pin 23 to enter the recess 26. The clearance 25 is large enough so the locating pin 23 does not carry any load. As the clutch member 3 moves to the engaged position, the detent balls 13 enter the semi-spherical depressions 16 and yieldably hold the clutch member in the driving position with a force dependent upon the depth of the depression 16 and the force exerted by the springs 14.

Under driving conditions, the interengaging cam faced surfaces 27, 28 on the recesses 22 and the projections 18 exert an axial force proportional to the driving torque tending to move the clutch member axially away from the member 1 toward the position shown in FIG. 1. When the force due to the driving torque exceeds the restraint offered by the balls 13, the clutch member 3 is moved axially toward the disengaged position with a snap action. The snap action results from the fact that the angle of contact between the balls 13 and the recesses 16 is a maximum when the balls are fully engaged in the recesses. As soon as the balls start to roll out of the recesses, the angle of contact decreases and therefore the holding or detent action decreases. Under normal driving conditions the balls 13 are fully engaged in the recesses 16, the clutch member 3 rotates with the member 1 and there is no force in a torsional direction tending to move the balls 13 out of the recesses 16. As soon as the axial force developed by the cam surfaces 27, 28 exceeds the threshold and axial movement of the clutch member 3 starts, there is a clearance developed between the pins 18 and the openings 21 and recesses 22 which is taken up by the driving torque so that a force is developed in a torsional direction tending to move the balls 13 out of the depressions 16 providing a further force tending to move the clutch member 3 to the disengaged position. When the pins 18 are disengaged from the recesses 22 the axial force of the clutch member 3 ceases and the engagement of the balls 13 with the detent groove 15 stops the clutch member in the released position.

In use, the coupling is placed in the driving position by turning the clutch element 3 while exerting an axial force on it toward the flange 6. As soon as the locating pin 23 comes opposite the locating recess 26, the clutch member 3 moves to the driving position where it is held by engagement of the balls 13 with the recesses 16. The drive is through cam faced surfaces 27, 28 which exert an axial force on the clutch member 3 tending to separate it from the member 1. When this axial force exceeds a threshold, the clutch element is moved with a snap action toward the disengaged position, the snap action being assisted by the driving torque due to the clearance between the pins 18 and the openings 21, 22. Upon reaching the fully disengaged position the clutch element is stopped by the detent action of balls 13 cooperating with the groove 15.

What is claimed is:

1. A coupling comprising driving and driven members journaled to each other, a clutch member supported on one of said members for rotation and axial movement relative to said one member, a drive key on the clutch member, the drive key and said one member having interengaging surfaces inhibiting relative rotation between the clutch member and said one member, the drive key and the other of said members having interengaging cam surfaces exerting an axial force in proportion to the drive torque in the direction to disengage the cam surfaces, and snap action detent means on said clutch member and said one member for resisting said axial force.

2. The coupling of claim 1 in which the detent means comprises a spring pressed ball in said clutch member and a recess in said one member.

3. The coupling of claim 2 in which the interengaging surfaces on said clutch member and said one member have angular lost motion therebetween as the axial movement of the clutch member relative to said one member starts so the relative angular movement between the clutch member and said one member assists in overcoming said detent means.

4. The coupling of claim 1 in which the drive key is tapered in the driving position and mates with complementary surfaces on said members.

5. The coupling of claim 4 in which the drive key is an axially extending tapered head on a pin fixed to said clutch member.

6. The coupling of claim 1 in which the drive key and said one of said members have interengaging cam surfaces exerting an axial force in proportion to the drive torque in the direction to disengage the cam surfaces.

7. The coupling of claim 6 in which the interengaging cam surfaces are on circumferentially spaced sides of said drive key.

* * * * *